(12) United States Patent
Singh et al.

(10) Patent No.: US 11,500,815 B2
(45) Date of Patent: Nov. 15, 2022

(54) DUAL RELATIONSHIP-BASED HASH STRUCTURE FOR NON-VOLATILE MEMORY TECHNOLOGY

(71) Applicant: EMC IP Holding Company LLC, Hopkinton, MA (US)

(72) Inventors: Gopal Singh, Lucknow (IN); Pooja Singh, Bangalore (IN); Rahul D. Vishwakarma, Bangalore (IN); Shelesh Chopra, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 421 days.

(21) Appl. No.: 16/830,418

(22) Filed: Mar. 26, 2020

(65) Prior Publication Data

US 2021/0303517 A1    Sep. 30, 2021

(51) Int. Cl.
*G06F 16/13* (2019.01)
*G06F 16/182* (2019.01)
*G06F 16/2455* (2019.01)
*H04L 9/08* (2006.01)
*G06F 16/17* (2019.01)

(52) U.S. Cl.
CPC ........ *G06F 16/137* (2019.01); *G06F 16/1734* (2019.01); *G06F 16/182* (2019.01); *G06F 16/24554* (2019.01); *H04L 9/0894* (2013.01)

(58) Field of Classification Search
CPC ............. G06F 16/24554; G06F 16/137; G06F 16/1734; G06F 16/182; G06F 16/13; H04L 9/0894

USPC ......................................................... 707/747
See application file for complete search history.

(56) References Cited

U.S. PATENT DOCUMENTS

| | | | | |
|---|---|---|---|---|
| 6,240,422 | B1 * | 5/2001 | Atkins | G06F 16/289 |
| | | | | 707/960 |
| 8,938,416 | B1 * | 1/2015 | Cole | G06F 16/2255 |
| | | | | 707/747 |
| 9,983,821 | B2 | 5/2018 | Sala et al. | |
| 10,318,434 | B2 | 6/2019 | Sala et al. | |
| 10,496,543 | B2 | 12/2019 | Sala et al. | |
| 2009/0006718 | A1 * | 1/2009 | Blumrich | G06F 12/0804 |
| | | | | 711/103 |

(Continued)

*Primary Examiner* — Shahid A Alam
(74) *Attorney, Agent, or Firm* — Ryan, Mason & Lewis, LLP

(57) ABSTRACT

Methods, apparatus, and processor-readable storage media for implementing dual relationship-based hash structures for non-volatile memory technology are provided herein. An example computer-implemented method includes generating a hash storage structure by: creating multiple layers of storage components, wherein a first layers comprise a first number of storage components and at least a second layer comprises at least a second number of storage components less than the first number of storage components; configuring the at least a second layer to share at least a portion of the storage components therein with at least a portion of the storage components in the first layer; partitioning each of the storage components in each of the multiple layers into multiple portions; configuring a respective status value space for each of the multiple portions of each of the storage components in the multiple layers; and implementing the hash storage structure in at least one storage system.

20 Claims, 14 Drawing Sheets

(56) References Cited

U.S. PATENT DOCUMENTS

| | | | |
|---|---|---|---|
| 2009/0271366 A1* | 10/2009 | Ellison | G06F 16/9014 |
| | | | 707/704 |
| 2014/0101235 A1* | 4/2014 | Smedberg | H04L 67/01 |
| | | | 709/203 |
| 2014/0337375 A1* | 11/2014 | Yue | G06F 16/2255 |
| | | | 707/769 |
| 2014/0337593 A1 | 11/2014 | Holbrook et al. | |
| 2016/0028699 A1* | 1/2016 | Ambroz | H04L 9/3242 |
| | | | 713/168 |
| 2016/0330034 A1* | 11/2016 | Back | G06Q 20/065 |
| 2019/0121988 A1* | 4/2019 | van de Ruit | H04L 9/0825 |

\* cited by examiner

```
t1 = hash(key)%N // N is the size of the L1
//Lookup the key in the different Levels
for each slot in L1[t1]
        if slot.key == key & slot.flag == 1
                return slot.value, slot, L1[t1]
t2 = hash(key)%N/2 // N/2 is the size of the L2
for each slot in L2[t2]
        if slot.key == key & slot.flag == 1
                return slot.value, slot, L2[t2]
t3 = hash(key)%N/4 // N/4 is the size of the L3
for each slot in L3[t3]
        if slot.key == key & slot.flag == 1
                return slot.value, slot, L3[t3]
return NULL
```

```
//Search the slot which contains the target key
slot = Search(key) [1]
//If not find the target key, return FALSE
if slot == NULL
            return FALSE
else
            //Otherwise, delete the item by an atomic write
            slot.flag = 0
            clflush(slot.flag)
            mfence()
            return TRUE
```

700

```
//Compute the hash location in the top level – Level 1
t1 = hash(key)%N // N is the size of the L1
t2 = hash(key)%N/2 // N is the size of the L2
t3 = hash(key)%N/4 // N is the size of the L3
//If there are any empty slots in the L1 buckets
if !(|L1[t1]| == N_SLOTS) //N_SLOTS: the number of slots in each bucket
        for each slot in L1[t1]
                if slot.flag == 0
                        slot.<key, value> = <key, value>
                        cflush(slot.<key, value>)
                        mfence()
                        slot.flag = 1
                        cflush(slot.flag)
                        mfence()
                        return TRUE
//If there are any empty slots in the L2 buckets
elseif !(|L2[t2]| == N_SLOTS)
        for each slot in L2[t2]
                if slot.flag == 0
                        slot.<key, value> = <key, value>
                        cflush(slot.<key, value>)
                        mfence()
                        slot.flag = 1
                        cflush(slot.flag)
                        mfence()
                        return TRUE
//If there are any empty slots in the L3 buckets
elseif !(|L3[t3]| == N_SLOTS)
        for each slot in L3[t3]
                if slot.flag == 0
                        slot.<key, value> = <key, value>
                        cflush(slot.<key, value>)
                        mfence()
                        slot.flag = 1
                        cflush(slot.flag)
                        mfence()
                        return TRUE
else
        return expand(N) //If the insert fails in all three buckets, the hash table needs to be expanded
```

FIG. 8

FIG. 9

```
//Search the slot which contains the target key
old_val, slot, bucket = Search(key)
//If not find, the update fails
if slot == NULL
        return FALSE
        //Check if an empty slot exists in this bucket
for each slot in this bucket
        //If true, perform log-free update since it is same bucket, the new and old slots' status is updated in an atomic write
        if slot.flag == 0
                slot.<key, value> = <key. value>
                cflush(slot.<key, value>)
                mfence()
                slot.flag = 1
                bucket->slot.flag = 0
                cflush(slot.flag)
                mfence()
                return TRUE //No empty slot in this bucket
//Log the old item
Log(bucket->slot)
mfence()
//Update the target item in place
bucket->slot.value = value
cflush(bucket->slot.value)
mfence()
return TRUE
```

900

```
//Rehash each item in the transition level which becomes the fourth level after a new level of size 2N is placed on top
for each slotold with <key, value> in TL
    //Search an empty slot in the top-two levels
    slotnew = SearchT2Levels(key)
    //Copy the key-value
    slotnew.<key, value> = slotold.<key, value>
    clflush(slotnew.<key, value>)
    mfence()
    slotnew.flag = 1
    clflush(slotnew.flag)
    mfence()
    //Delete the item from the old slot
    slotold.flag = 0
    clflush(slotold.flag)
    mfence()
```

```
//Re-hash each item in the transition level, i.e., the old T1 level
for each slotold with <key, value> in TL
    //Search an empty slot in the bottom-two levels
    slotnew = SearchB2Levels(key)
    //Copy the key-value
    slotnew.<key, value> = slotold.<key, value>
    clflush(slotnew.<key, value>)
    mfence()
    slotnew.flag = 1
    clflush(slotnew.flag)
    mfence()
    //Delete the item from the old slot
    slotold.flag = 0
    clflush(slotold.flag)
    mfence()
```

FIG. 11

DUAL RELATIONSHIP-BASED HASH STRUCTURE FOR NON-VOLATILE MEMORY TECHNOLOGY

FIELD

The field relates generally to information processing systems, and more particularly to storage in such systems.

BACKGROUND

In the field of persistent memories, non-volatile memories (NVMs) are increasingly used as a replacement for conventional dynamic random-access memory (DRAM) technology. However, because NVMs and conventional DRAM technology include different hardware architectures, the memory structures built for conventional DRAM technology are typically inefficient if used in NVMs.

SUMMARY

Illustrative embodiments of the disclosure provide dual relationship-based hash structures for non-volatile memory technology. An exemplary computer-implemented method includes generating a hash storage structure by creating multiple layers of storage components, wherein a first of the multiple layers includes a first number of storage components and wherein at least a second of the multiple layers includes at least a second number of storage components, wherein the at least a second number of storage components is less than the first number of storage components. Generating the hash storage structure also includes configuring the at least a second of the multiple layers to share at least a portion of the storage components therein with at least a portion of the storage components in the first layer, partitioning each of the storage components in each of the multiple layers into multiple portions, and configuring a respective status value space for each of the multiple portions of each of the storage components in the multiple layers. The method additionally includes implementing the generated hash storage structure in at least one storage system.

Illustrative embodiments can provide significant advantages relative to conventional DRAM technology. For example, problems associated with hardware architecture differences across storage technologies are overcome in one or more embodiments through the generation of a hash storage structure that includes configuring multiple layers of storage components to share at least portions of the storage components across two or more of the layers.

These and other illustrative embodiments described herein include, without limitation, methods, apparatus, systems, and computer program products comprising processor-readable storage media.

BRIEF DESCRIPTION OF THE DRAWINGS

FIG. 6 shows an example code snippet for implementing a search operation algorithm in an illustrative embodiment.

FIG. 8 shows an example code snippet for implementing an insert operation algorithm in an illustrative embodiment.

FIG. 9 shows an example code snippet for implementing an update operation algorithm in an illustrative embodiment.

FIG. 10 shows an example code snippet for implementing an expand operation algorithm in an illustrative embodiment.

FIG. 11 shows an example code snippet for implementing a shrink operation algorithm in an illustrative embodiment.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
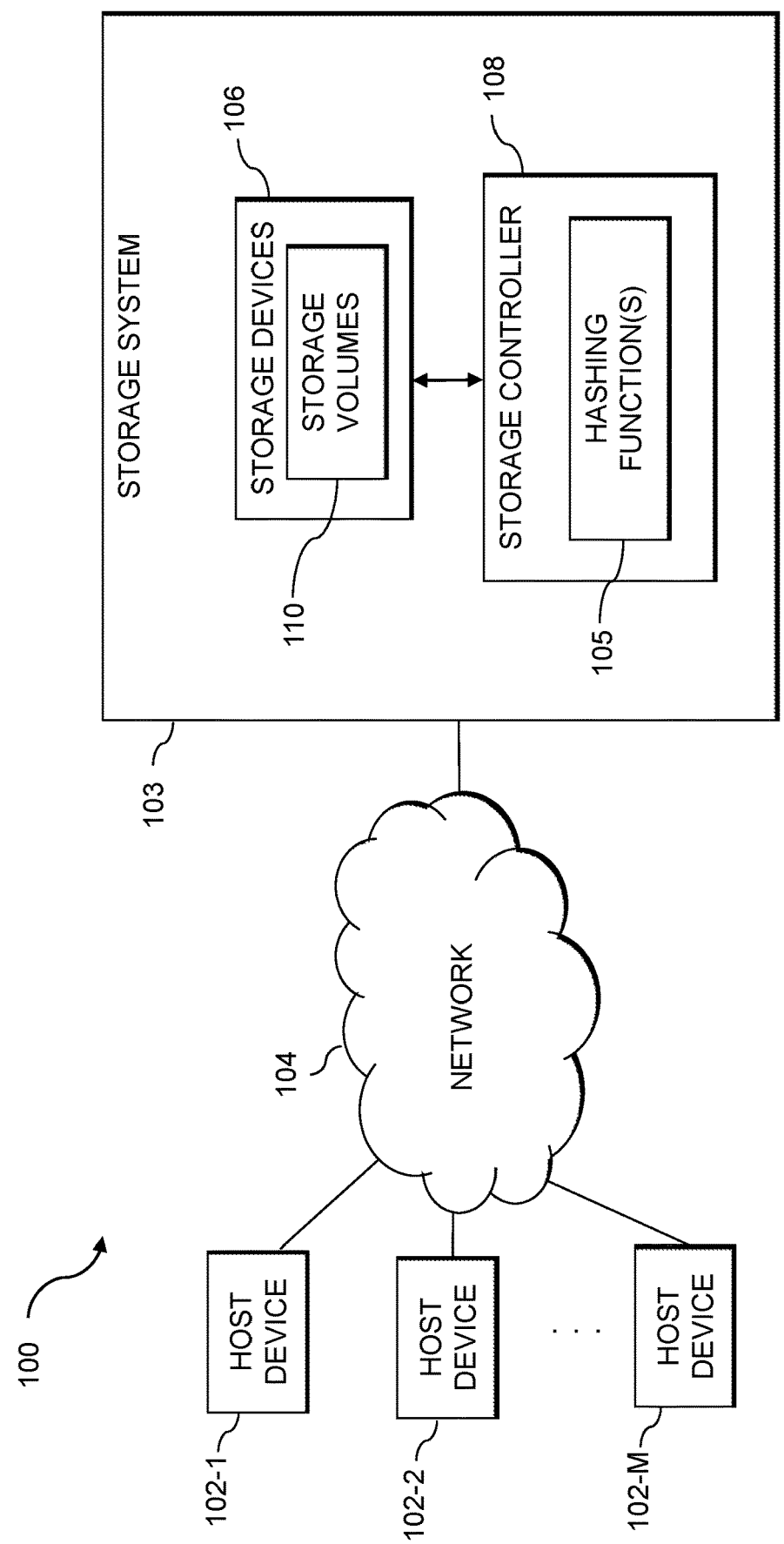
FIG. 1 shows an information processing system configured for implementing dual relationship-based hash structures for non-volatile memory technology in an illustrative embodiment.

FIG. 1 shows an information processing system 100 configured in accordance with an illustrative embodiment. The information processing system 100 comprises a plurality of host devices 102-1, 102-2, . . . 102-M, collectively referred to herein as host devices 102. The host devices 102 are coupled to a network 104. Also coupled to network 104 is storage system 103. The host devices 102 are configured to communicate with the storage system 103 over network 104.

The host devices 102 illustratively comprise servers or other types of computers of an enterprise computer system, cloud-based computer system or other arrangement of multiple compute nodes associated with respective users. For example, the host devices 102 in some embodiments illustratively provide compute services such as execution of one or more applications on behalf of each of one or more users associated with respective ones of the host devices. In one or more embodiments, the host devices 102 comprises a processor coupled to a memory. The host devices 102 are therefore an example of what is more generally referred to herein as a processing device comprising a processor coupled to a memory. The processor executes application processes of one or more applications on behalf of each of one or more users of the host device 102. Such application process execution results in the generation of write operations and read operations that are directed by the host device 102 to the storage system 103 in the manner disclosed herein.

The storage system 103 illustratively comprises processing devices of one or more processing platforms. For example, the storage system 103 can comprise one or more processing devices each having a processor and a memory, possibly implementing virtual machines and/or containers, although numerous other configurations are possible.

The storage system 103 can additionally or alternatively be part of cloud infrastructure such as an Amazon Web Services (AWS) system. Other examples of cloud-based systems that can be used to provide at least portions of the storage system 103 include Google Cloud Platform (GCP) and Microsoft Azure.

The host devices 102 and the storage system 103 may be implemented on a common processing platform, or on separate processing platforms. The host devices 102 are illustratively configured to write data to and read data from the storage system 103 in accordance with applications executing on those host devices for system users.

Also, it is to be appreciated that the term "user" in this context and elsewhere herein is intended to be broadly construed so as to encompass, for example, human, hardware, software or firmware entities, as well as various combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a Wi-Fi or WiMAX network, or various portions or combinations of these and other types of networks. The network 104 in some embodiments therefore comprises combinations of multiple different types of networks, each comprising processing devices configured to communicate using internet protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The storage system 103 comprises a plurality of storage devices 106 and an associated storage controller 108. The storage devices 106 store data of a plurality of storage volumes 110. The storage volumes 110 illustratively comprise respective logical units (LUNs) or other types of logical storage volumes. It should be appreciated, however, that the term "storage volume" as used herein is intended to be broadly construed, and should not be viewed as being limited to any particular format or configuration.

The storage devices 106 of the storage system 103 illustratively comprise solid state drives (SSDs). Such SSDs are implemented using NVM devices such as flash memory. Other types of NVM devices that can be used to implement at least a portion of the storage devices 106 include non-volatile random access memory (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of NVM devices may also be used. For example, hard disk drives (HDDs) can be used in combination with or in place of SSDs or other types of NVM devices.

However, it is to be appreciated that other types of storage devices can be used in storage system 103 in other embodiments. For example, a given storage system, as the term is broadly used herein, can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises hard disk drives. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices.

In some embodiments, the storage system 103 illustratively comprises a scale-out all-flash content addressable storage array such as an XtremIO™ storage array from Dell EMC of Hopkinton, Mass. A wide variety of other types of storage arrays can be used in implementing a given one of the storage system 103 in other embodiments, including by way of example one or more VNX®, VMAX®, Unity™ or PowerMax™ storage arrays, commercially available from Dell EMC. Additional or alternative types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

The term "storage system" as used herein is therefore intended to be broadly construed, and should not be viewed as being limited to storage systems based on flash memory or other types of NVM storage devices. A given storage system as the term is broadly used herein can comprise, for example, network-attached storage (NAS), storage area networks (SANs), direct-attached storage (DAS) and distributed DAS, as well as combinations of these and other storage types, including software-defined storage.

In some embodiments, communications between the host devices 102 and the storage system 103 comprise Small Computer System Interface (SCSI) or Internet SCSI (iSCSI) commands. Other types of SCSI or non-SCSI commands may be used in other embodiments, including commands that are part of a standard command set, or custom commands such as a "vendor unique command" or VU command that is not part of a standard command set. The term "command" as used herein is therefore intended to be broadly construed, so as to encompass, for example, a composite command that comprises a combination of multiple individual commands. Numerous other commands can be used in other embodiments.

For example, although in some embodiments certain commands used by the host devices 102 to communicate with the storage system 103 illustratively comprise SCSI or iSCSI commands, other embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The storage controller 108 of storage system 103 in the FIG. 1 embodiment includes hashing function(s) 105. One or more such hashing functions can include, for example, Secure Hashing Algorithm 1 (SHA1) SHA2, SHA256, or more generally other hash functions. The storage controller 108 can also include additional elements, such as replication control logic for controlling replication of one or more of the storage volumes 110 to another storage system not shown in the figure. The storage controller 108 and the storage system 103 may further include one or more additional modules and other components typically found in conventional implementations of storage controllers and storage systems, although such additional modules and other components are omitted from the figure for clarity and simplicity of illustration.

It should be noted that one or more functionalities of storage system 103 (including that provided by hashing function(s) 105) as described herein with reference to host devices 102 can additionally or alternatively be implemented by each of one or more of the additional host devices 102. For example, each of the host devices 102 can be configured to include the hashing function(s) 105 of storage system 103.

The storage system 103 is illustratively implemented as a distributed storage system, also referred to herein as a clustered storage system, in which such a storage system comprises a plurality of storage nodes each comprising a set of processing modules configured to communicate with corresponding sets of processing modules on other ones of the storage nodes. The sets of processing modules of the storage nodes of the storage system 103 collectively comprise at least a portion of the storage controller 108 of the storage system 103. For example, in some embodiments the sets of processing modules of the storage nodes collectively comprise a distributed storage controller of the distributed storage system.

It is to be understood that the particular set of elements shown in FIG. 1 for implementing dual relationship-based hash structures for non-volatile memory technology is presented by way of illustrative example only, and in other embodiments additional or alternative elements may be used. Thus, another embodiment includes additional or alternative systems, devices and other network entities, as well as different arrangements of modules and other components.

An exemplary process utilizing storage controller 108 and/or hashing function(s) 105 will be described in more detail with reference to the flow diagram of FIG. 12.

Accordingly, at least one embodiment includes implementing dual relationship-based hash structures for non-volatile memory technology. As detailed herein, such an embodiment includes implementing a hashing data structure that improves over existing conventional structures in terms of optimized writes by shared storage components, search domain, computational cost (by using a unique single hash function), update operations by conditional logging, resizability, etc.

In one or more example embodiments, a dual relationship-based hash structure includes multiple slots (e.g., eight slots) per bucket and one status flag byte per bucket. As used herein, a bucket is an example of what is more generally referred to herein as a storage component, which is illustratively a data structure such as a bucket which can include a collection of key-value pairs (for example, eight pairs in one or more example embodiments detailed herein). The size of such pairs may not necessarily be fixed. Also, as used herein, a slot refers to one key-value pair, and a status flag byte refers to one byte of data associated with each bucket, wherein each status flag byte can hold, for example, eight bits, each corresponding to one slot, denoting whether the slot is filled or empty. Moreover, as used herein, with respect to a key-value pair, a key refers to a hash value of a data chunk, and a value refers to the data chunk itself.

In at least one embodiment, multiple slots can deal with hash collisions as well as help improve caching by prefetching all slots if one slot is accessed, thereby reducing memory accesses. As used herein, a hash collision occurs when two chunks of data, when inputted to a hashing function, give the same output hash value, meaning that, for two different data chunks (i.e., values), the key is the same. Additionally, in such an embodiment, status flag bits for one or more of the slots can be updated in one atomic write operation.

Such an embodiment can also include implementing multiple layers (e.g., two layers) of shared buckets for a primary layer, which provides extra space for improved performance at higher load factors. Relationships pertaining to such shared buckets can be leveraged, for example, during hash resizing to ensure fewer rehashes (than using conventional approaches).

Additionally, as also detailed herein, at least one example embodiment includes implementing a single function to determine the hash location for a key. Such an embodiment can thereby incur less computation costs (than conventional approaches) due to the implementation of only one hash function, and can also utilize less search domain (for example, a maximum of three buckets for a key).

One or more embodiments also include efficient resizing of hash tables via implementation of at least one hash structure detailed herein. For instance, an example embodiment can include requiring approximately one-seventh of the parts required by conventional approaches to rehash during expansion (that is, the adding of memory), and approximately four-sevenths of the parts required by conventional approaches to rehash during shrinking (that is, the reduction of memory).

Figure 2:
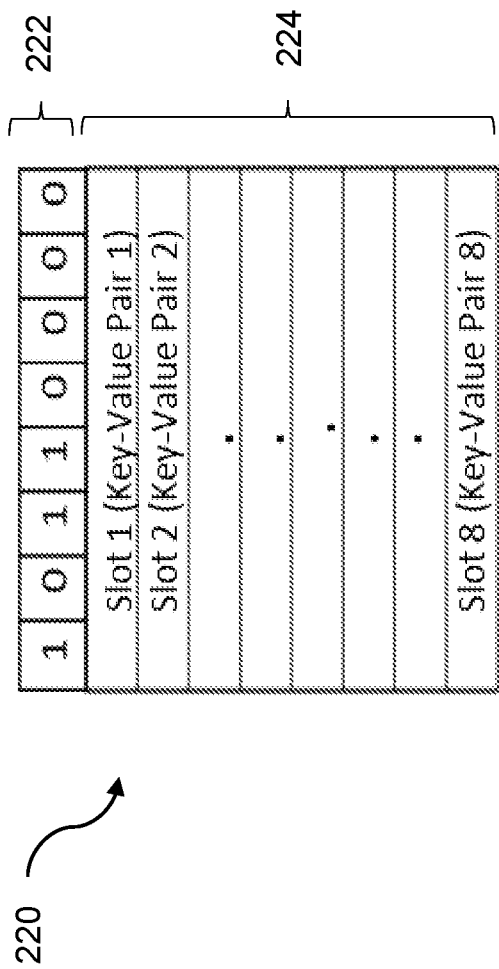
FIG. 2 shows an example logical structure of a storage component in an illustrative embodiment.

FIG. 2 shows an example logical structure of a storage component in an illustrative embodiment. By way of illustration, FIG. 2 depicts an example storage component (e.g., a bucket) 220 that contains eight slots 224 and eight status flag byte spaces 222, with one status flag byte configured per slot. Accordingly, in such an example embodiment, a hash structure can include eight slots in every bucket, each for one key-value pair. Also, such a hash structure can include a one byte-length status register associated with every bucket, wherein each bit represents the status of its corresponding slot. In implementing such an example hash structure, a "0" entry indicates that there is no valid data in the bucket (indicating that the bucket is available for a write operation), and a "1" entry indicates that the bucket holds a key-value pair. Maintaining, for example, eight slots in a bucket results in the ability for the bucket to effectively handle seven hash collisions. Also, in such an example embodiment, the status flags (which are eight-bit long in total) can be updated in a single atomic write operation.

Figure 3:
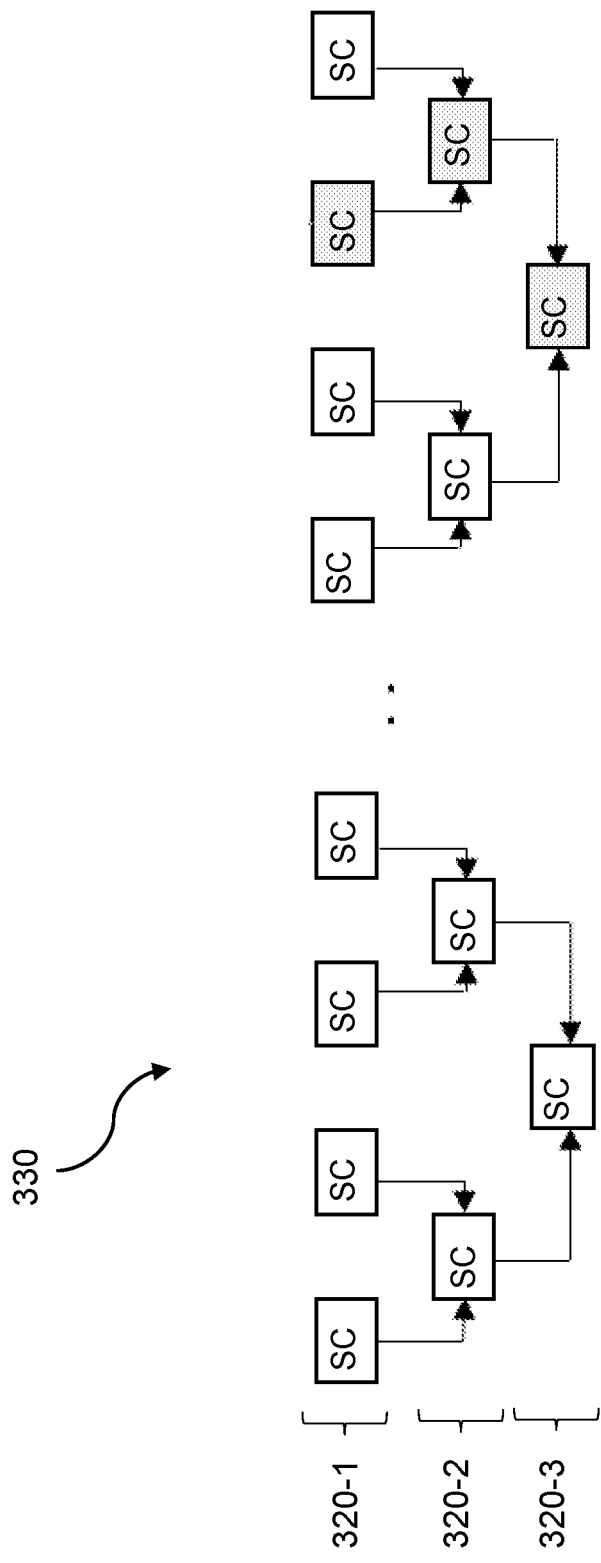
FIG. 3 shows an example logical structure of a hash storage structure in an illustrative embodiment.

FIG. 3 shows an example logical structure of a hash storage structure in an illustrative embodiment. By way of illustration, FIG. 3 depicts an example hash storage structure (e.g., a hash table) 330 which includes three layers of storage components (SCs; e.g., buckets): layer 320-1 (also referred to herein as Layer1 or L1), layer 320-2 (also referred to herein as Layer2 or L2), and layer 320-3 (also referred to herein as Layer3 or L3). By way of further illustration, in the example embodiment depicted in FIG. 3, assume that layer 320-1 (L1) includes Nbuckets, layer 320-2 (L2) includes N/2 buckets, and layer 320-3 (L3) includes N/4 buckets.

Accordingly, in such an example embodiment, two or more layers share one or more buckets. As illustrated in FIG. 3, for instance, each bucket in layer 320-1 (L1) shares a relationship with two more buckets, one in each of layer 320-2 (L2) and layer 320-3 (L3). Once the slots in a given L1 bucket become full, any new data (e.g., key-value pairs) is written to the shared bucket in L2, which is shared with another bucket in L1. In a case wherein this bucket is also full, new data is written to the shared bucket in L3, which is shared by another bucket in L2. The sharing of L2 and L3 buckets increases the likelihood that these buckets are not under-utilized.

As also detailed herein, one or more embodiments include utilizing a single function to determine the hash location for a key. Such an embodiment includes introducing and/or implementing a layered data structure with shared buckets and having multiple slots at each hash location.

At least one embodiment also includes enabling efficient resizing of hash tables. By way of illustration, a static technique used in conventional hash structures forces new hash values to be created once the size of the table changes. This results in rehashing all of the stored data so that there is no corruption of the data when a hash for a key is calculated using the new size. In the proposed architecture according to one or more embodiments, for hash table expansion, the hashes for, for example, three layers are calculated using the modulus operation of N, N/2, and N/4 for L1, L2, and L3, respectively.

Figure 4:
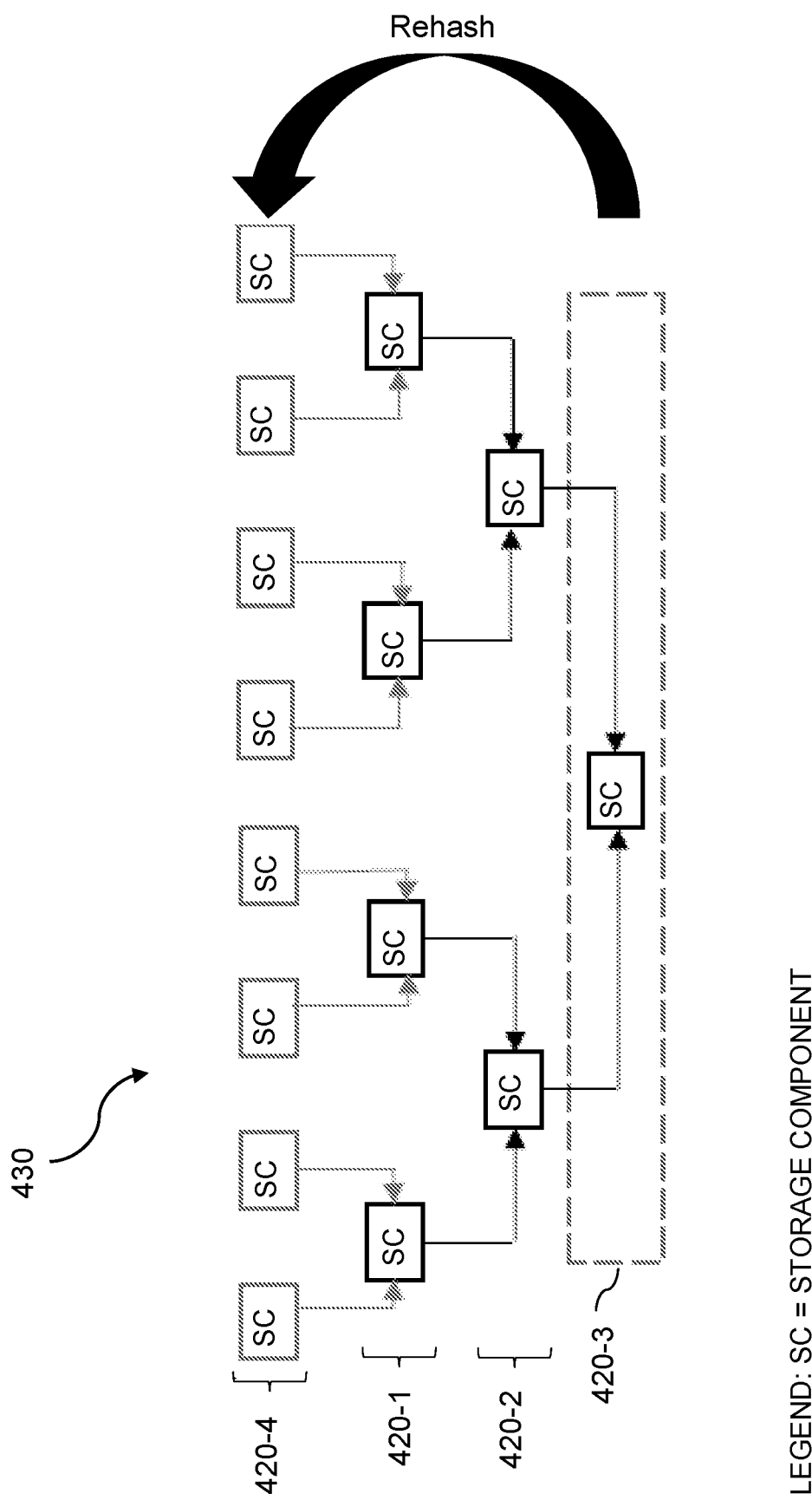
FIG. 4 shows expansion of an example hash storage structure in an illustrative embodiment.

FIG. 4 shows expansion of an example hash storage structure in an illustrative embodiment. By way of illustration, FIG. 4 depicts an example hash storage structure 430 which includes four layers of storage components (SCs; e.g., buckets): layer 420-1 (also referred to herein as previous Layer1 or previous L1), layer 420-2 (also referred to herein as previous Layer2 or previous L2), layer 420-3 (also referred to herein as previous Layer3 or previous L3), and layer 420-4 (also referred to herein as additional layer or transition layer). By way of further illustration, in the example embodiment depicted in FIG. 4, assume that layer 420-1 (previous L1) includes N buckets, layer 420-2 (previous L2) includes N/2 buckets, layer 420-3 (previous L3) includes N/4 buckets, and layer 420-4 (transition layer) includes 2N buckets.

Accordingly, for expansion scenarios in connection with an example embodiment, a memory space of 2N size is reserved and referred to herein as a transition layer (TL) 420-4. The TL is logically placed over the L1 420-1 such that the architecture resembles a four-layered structure during expansion. Then, a hash is calculated for TL 420-4. The previous L1 420-1 becomes the new L2, and the previous L2 420-2 becomes the new L3. The items from the previous L3 420-3 are remapped to the new L1 420-4, and all data in the previous L3 420-3 are marked invalid by an atomic write operation. Accordingly, the buckets of the previous L3 420-3 become eligible for new write operations.

A benefit of this architecture is that when the size is doubled to 2N, the hashes for L1 become valid for L2, and hashes for L2 become valid for L3. Accordingly, only L1 buckets need to be rehashed. Because L3, in this example, holds one-seventh of the data, only one-seventh of the total data needs to be rehashed. Subsequently, the space from the old/previous L3 can be reclaimed.

Figure 5:
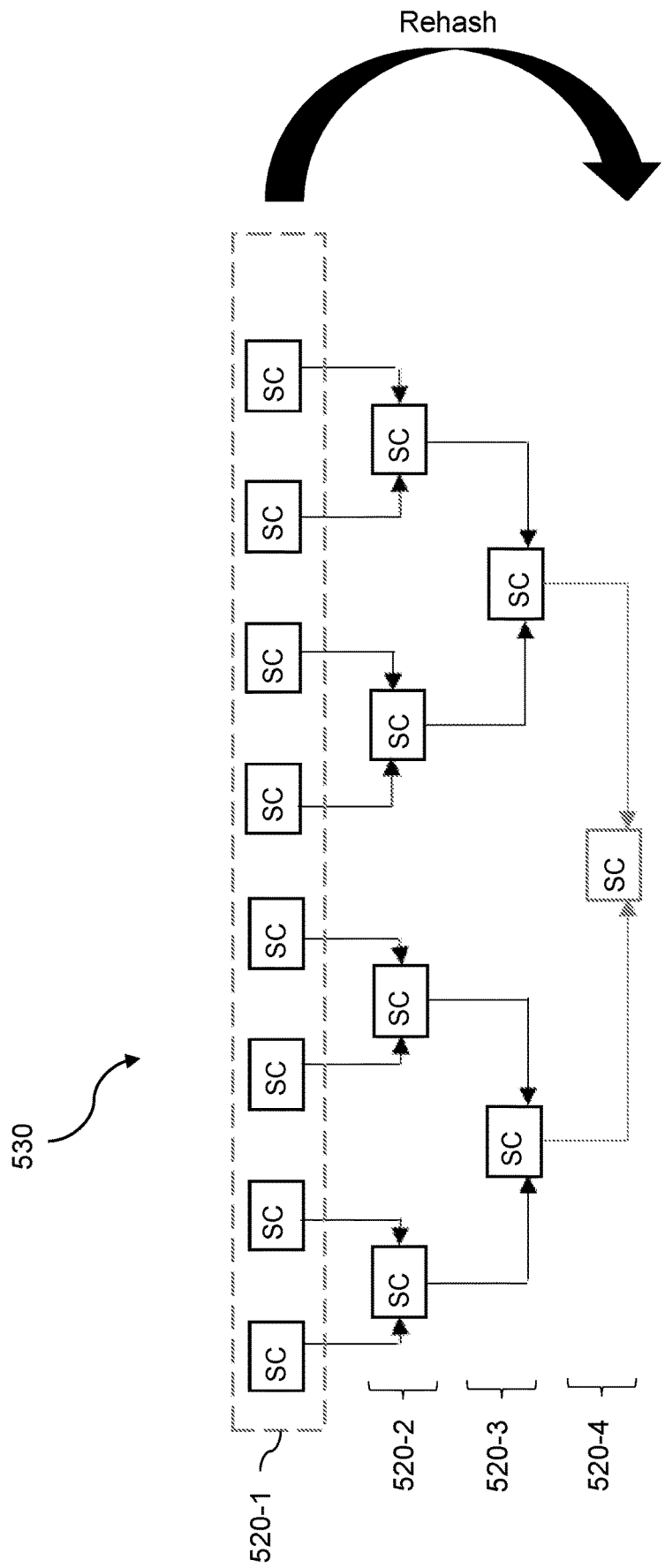
FIG. 5 shows resizing of an example hash storage structure in an illustrative embodiment.

FIG. 5 shows resizing of an example hash storage structure in an illustrative embodiment. By way of illustration, FIG. 5 depicts an example hash storage structure 530 which includes four layers of storage components (SCs; e.g., buckets): layer 520-1 (also referred to herein as Layer1 or L1), layer 520-2 (also referred to herein as Layer2 or L2), layer 520-3 (also referred to herein as Layer3 or L3), and layer 520-4 (also referred to herein as additional layer or transition layer). By way of further illustration, in the example embodiment depicted in FIG. 5, assume that layer 520-1 (L1) includes N buckets, layer 520-2 (L2) includes N/2 buckets, layer 520-3 (L3) includes N/4 buckets, and layer 520-4 (transition layer) includes N/8 buckets.

Accordingly, for shrinking scenarios in connection with an example embodiment, contents of a space of N/8 are reserved, placed below L3 (520-3), and referred to as the TL 520-4. The items from L1 520-1 are rehashed into the TL 520-4. Subsequently, L2 520-2 becomes the new L1, L3 520-3 becomes the new L2, and the TL 5204-4 becomes the new L3. Additionally, the data in L1 520-1 are marked invalid by setting the flags to 0 such that slots in 520-1 are available for new write operations. In such an example implementation, only four-sevenths of the data is rehashed.

To ensure data consistency in persistent memory, one or more embodiments include ensuring that memory writes are carried out in an order. By way of example, central processing units (CPUs) and memory controllers can reorder memory writes, and instructions for cache line flush (CLFLUSH) and memory fence (MFENCE) can be used to enforce the ordering. In such an example, CLFLUSH can generate a dirty cache line from the CPU cache and write it to an NVM. Further, MFENCE creates a memory fence, which blocks the memory access instructions until those before the fence have completed. In at least one embodiment, CLFLUSH and MFENCE are used together to ensure that write operations are performed in order.

Example implementations of such instructions are depicted in FIG. 6 through FIG. 11 in connection with algorithms for search, delete, insert, update, expand and shrink operations for at least one hash structure implemented in accordance with one or more embodiments.

FIG. 6 shows an example code snippet for implementing a search operation algorithm in an illustrative embodiment. In this embodiment, example code snippet 600 is executed by or under the control of at least one processing system and/or storage system. For example, the example code snippet 600 may be viewed as comprising a portion of a software implementation of at least part of storage controller 108 of the FIG. 1 embodiment.

The example code snippet 600 illustrates a search operation wherein the data chunk to be searched is hashed to generate the key value. This key value is first searched in L1, then L2, and then L3. If any key in these levels matches the generated key, then the corresponding value is returned. If there is no match, null is returned, indicating that the chunk is not present.

It is to be appreciated that this particular example code snippet shows just one example implementation of a search operation algorithm, and alternative implementations of the process can be used in other embodiments.

Figure 7:
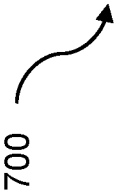
FIG. 7 shows an example code snippet for implementing a delete operation algorithm in an illustrative embodiment.

FIG. 7 shows an example code snippet for implementing a delete operation algorithm in an illustrative embodiment. In this embodiment, example code snippet 700 is executed by or under the control of at least one processing system and/or storage system. For example, the example code snippet 700 may be viewed as comprising a portion of a software implementation of at least part of storage controller 108 of the FIG. 1 embodiment.

The example code snippet 700 illustrates a delete operation wherein, first, the key corresponding to data to be deleted is searched for in the hash table. If the key is not found, then the delete operation is unsuccessful. If the key is found, the corresponding slot is emptied by deleting both the key and the value.

It is to be appreciated that this particular example code snippet shows just one example implementation of a delete operation algorithm, and alternative implementations of the process can be used in other embodiments.

FIG. 8 shows an example code snippet for implementing an insert operation algorithm in an illustrative embodiment. In this embodiment, example code snippet 800 is executed by or under the control of at least one processing system and/or storage system. For example, the example code snippet 800 may be viewed as comprising a portion of a software implementation of at least part of storage controller 108 of the FIG. 1 embodiment.

The example code snippet 800 illustrates an insert operation wherein, first, the data to be inserted are hashed to obtain the key. The key-value pair is inserted in Level 1 if any slot is empty. If not, Level 2 is checked for an empty slot, and the key-value pair is inserted if any slot is empty. If not, then Level 3 is checked. If an empty slot is still not found, then the hash is expanded by calling an expansion workflow.

It is to be appreciated that this particular example code snippet shows just one example implementation of an insert operation algorithm, and alternative implementations of the process can be used in other embodiments.

FIG. 9 shows an example code snippet for implementing an update operation algorithm in an illustrative embodiment. In this embodiment, example code snippet 900 is executed by or under the control of at least one processing system and/or storage system. For example, the example code snippet 900 may be viewed as comprising a portion of a software implementation of at least part of storage controller 108 of the FIG. 1 embodiment.

The example code snippet 900 illustrates an update operation wherein, first, the key corresponding to data to be updated is searched for in the table. The operation fails if the data are not found. If there is a free slot available in the same bucket, the new data are added, and old data are deleted in one atomic write. If a slot is not available, the data are temporarily logged at a location and then an update is performed.

It is to be appreciated that this particular example code snippet shows just one example implementation of an update operation algorithm, and alternative implementations of the process can be used in other embodiments.

FIG. 10 shows an example code snippet for implementing an expand operation algorithm in an illustrative embodiment. In this embodiment, example code snippet 1000 is executed by or under the control of at least one processing system and/or storage system. For example, the example code snippet 1000 may be viewed as comprising a portion of a software implementation of at least part of storage controller 108 of the FIG. 1 embodiment.

The example code snippet 1000 illustrates an expansion workflow wherein the hashes for the top two layers are calculated based on double the size of a present hash. The slots from the bottom-most layer are copied into the free slots of above layers. Subsequently, the bottom-most layer is emptied.

It is to be appreciated that this particular example code snippet shows just one example implementation of an expand operation algorithm, and alternative implementations of the process can be used in other embodiments.

FIG. 11 shows an example code snippet for implementing a shrink operation algorithm in an illustrative embodiment. In this embodiment, example code snippet 1100 is executed by or under the control of at least one processing system and/or storage system. For example, the example code snippet 1100 may be viewed as comprising a portion of a software implementation of at least part of storage controller 108 of the FIG. 1 embodiment.

The example code snippet 1100 illustrates a shrink operation workflow wherein hashes are recalculated based on half the size of a present hash table. Then, the slots from the top-most layer are copied into the bottom two layers, and the top-most layer is freed.

It is to be appreciated that this particular example code snippet shows just one example implementation of a shrink operation algorithm, and alternative implementations of the process can be used in other embodiments.

Figure 12:
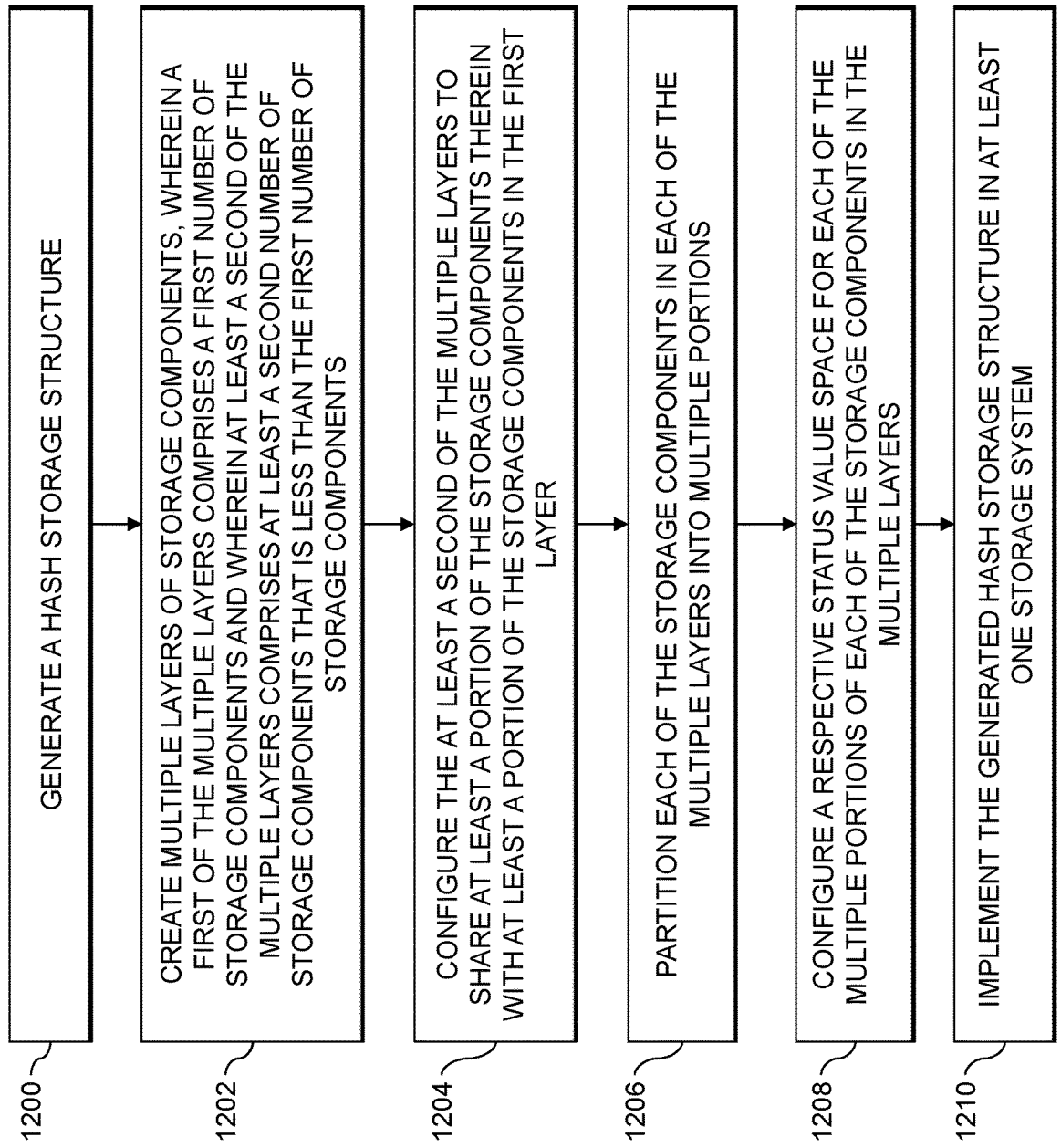
FIG. 12 is a flow diagram of a process for implementing dual relationship-based hash structures for non-volatile memory technology in an illustrative embodiment.

FIG. 12 is a flow diagram of a process for implementing dual relationship-based hash structures for non-volatile memory technology in an illustrative embodiment. It is to be understood that this particular process is only an example, and additional or alternative processes can be carried out in other embodiments.

In this embodiment, the process includes steps 1200 through 1210. These steps are assumed to be performed at least in part by a storage controller (e.g., storage controller 108 in the FIG. 1 embodiment) utilizing one or more hashing functions (e.g., hashing function(s) 105 in the FIG. 1 embodiment).

Step 1200 includes generating a hash storage structure. Generating the hash storage structure via step 1200 also includes the actions carried out via steps 1202, 1204, 1206, and 1208.

Step 1202 includes creating multiple layers of storage components (e.g., buckets), wherein a first of the multiple layers comprises a first number of storage components and wherein at least a second of the multiple layers comprises at least a second number of storage components, wherein the at least a second number of storage components is less than the first number of storage components. By way of example, in one or more embodiments, the first of the multiple layers can include N storage components, and a second of the multiple layers can include N/2 storage components. Further, in at least one embodiment, a one byte-length status register is associated with each of the storage components in each of the multiple layers.

Step 1204 includes configuring the at least a second of the multiple layers to share at least a portion of the storage components therein with at least a portion of the storage components in the first layer. In at least one embodiment, configuring the at least a second of the multiple layers includes configuring a second of the multiple layers to share one of the storage components therein with at least two storage components in the first layer. Additionally or alternatively, configuring the at least a second of the multiple layers can include configuring data to be written to in a given one of the storage components of a second of the multiple layers upon a determination that a first of the storage components in the first layer is full, wherein the given one of the storage components of the second layer is also shared with at least a second of the storage components in the first layer.

Step 1206 includes partitioning each of the storage components in each of the multiple layers into multiple portions (also referred to herein as slots). In one or more embodiments, each of the multiple portions is configured to store one key-value pair.

Step 1208 includes configuring a respective status value (also referred to herein as a flag byte) space for each of the multiple portions of each of the storage components in the multiple layers. In at least one embodiment, the status value space includes a space for at least one of a value indicating that the respective portion of the storage component is available for a write operation and a value indicating that the respective portion of the storage component holds a key-value pair. Step 1210 includes implementing the generated hash storage structure in at least one storage system. In one or more embodiments, implementing the generated hash storage structure in at least one storage system can be performed concurrently with the steps involved in generating the hash storage structure.

One or more embodiments also include expanding the generated hash storage structure by inserting an additional layer of storage components to the generated hash structure, wherein the additional layer includes a number of storage components that is greater than the first number of storage components contained within the first of the multiple layers. In such an embodiment, the first of the multiple layers can include N storage components, a second of the multiple layers can include N/2 storage components, and the additional layer can include 2N storage components. Additionally, expanding the generated hash storage structure can include mapping data from a last of the multiple layers to the additional layer, and rendering the last of the multiple layers eligible for storage.

Additionally or alternatively, at least one embodiment includes resizing the generated hash storage structure by inserting an additional layer of storage components to the generated hash structure, wherein the additional layer includes a number of one or more storage components that is less than the number of storage components contained within the last of the multiple layers. In such an embodiment, resizing the generated hash storage structure includes mapping data from the first of the multiple layers to the additional layer, and rendering the first of the multiple layers eligible for storage.

Accordingly, the particular processing operations and other functionality described in conjunction with the flow diagram of FIG. 12 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to generate a hash storage structure that includes configuring multiple layers of storage components to share at least portions of the storage components across two or more of the layers. These and other embodiments can effectively overcome problems associated with hardware architecture differences across storage technologies.

Example use cases for one or more embodiments of the invention can include index main memory databases and main memory systems, in-memory key-value stores, associative arrays or maps, database indexing for query responses, caches and sets, etc.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 13 and 14. Although described in the context of system 100, these platforms may also be used to implement at least portions of other information processing systems in other embodiments.

Figure 13:
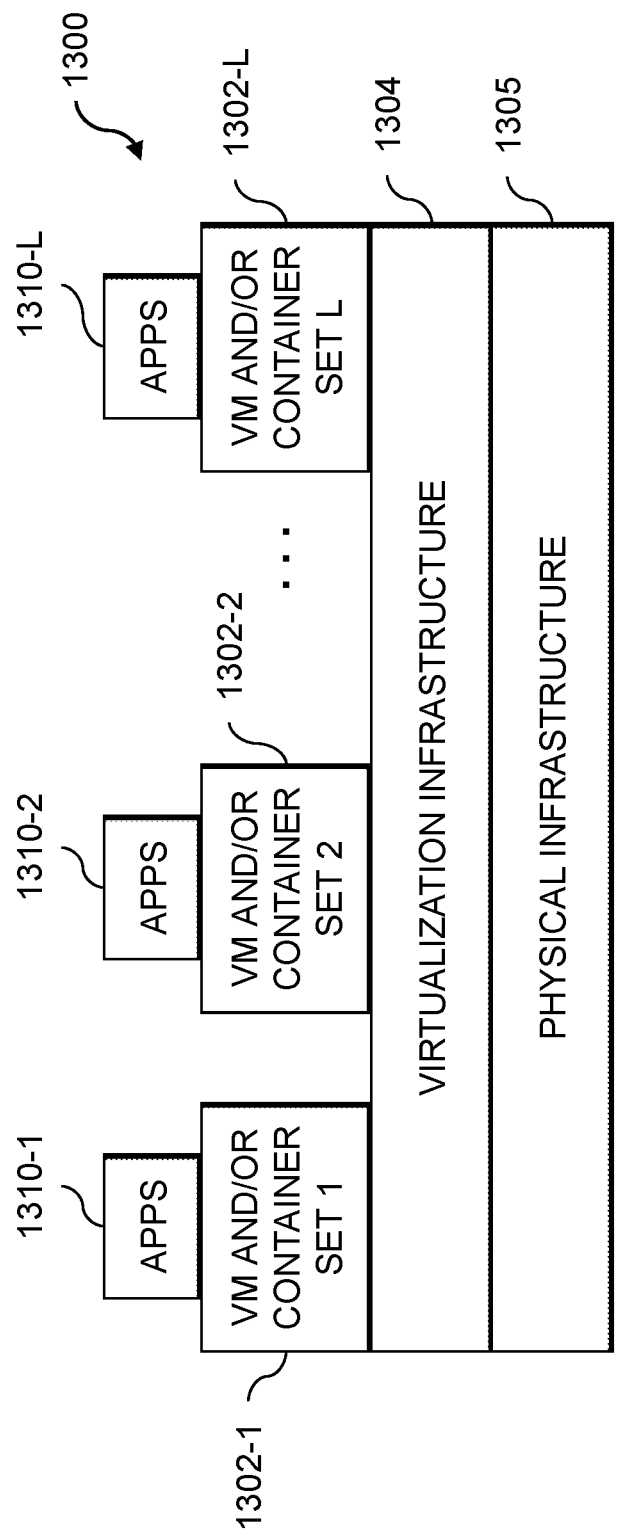
FIGS. 13 and 14 show examples of processing platforms that may be utilized to implement at least a portion of an information processing system in illustrative embodiments.
Figure 14:
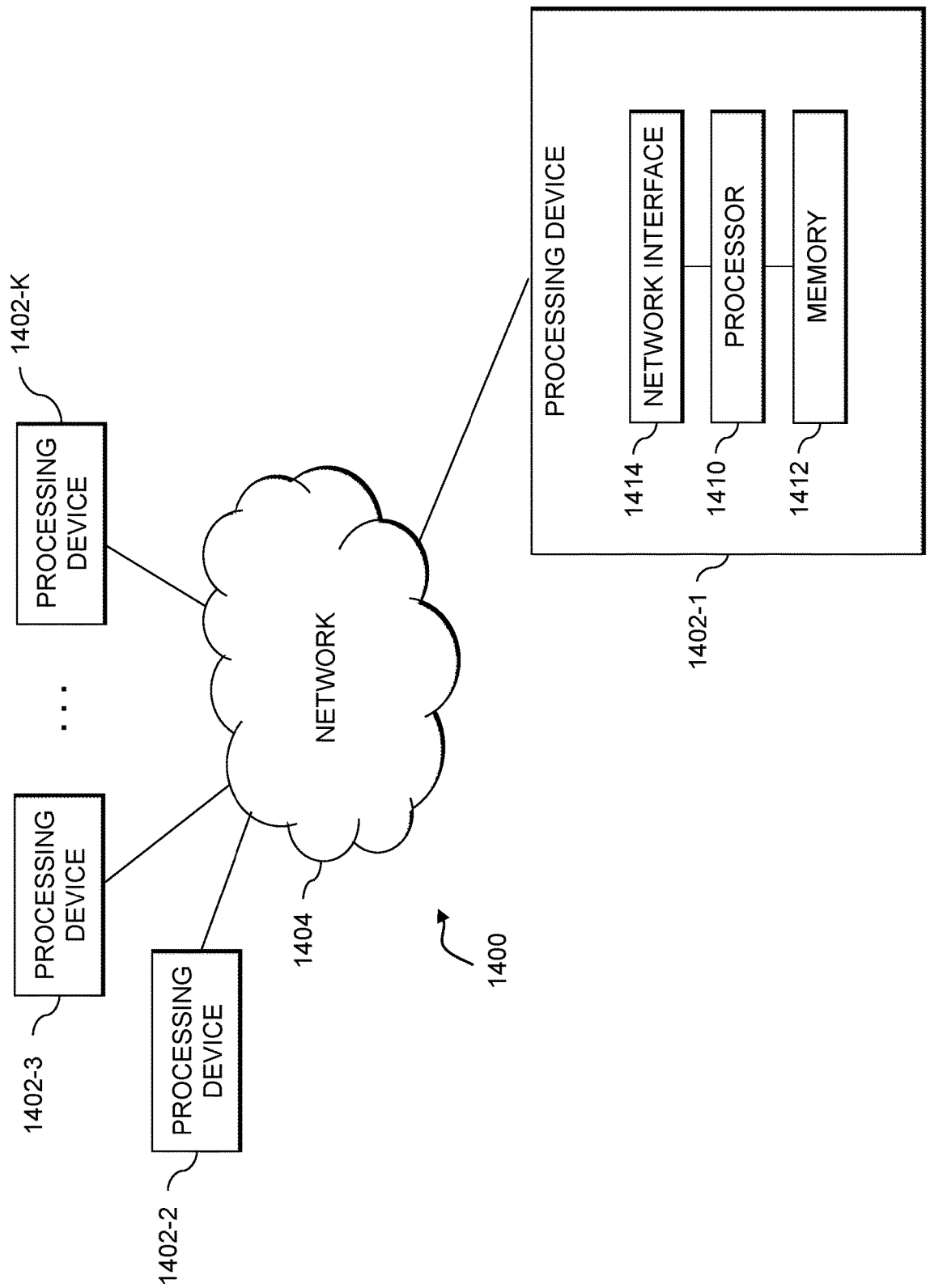

FIG. 13 shows an example processing platform comprising cloud infrastructure 1300. The cloud infrastructure 1300 comprises a combination of physical and virtual processing resources that are utilized to implement at least a portion of the information processing system 100. The cloud infrastructure 1300 comprises multiple virtual machines (VMs) and/or container sets 1302-1, 1302-2, . . . 1302-L implemented using virtualization infrastructure 1304. The virtualization infrastructure 1304 runs on physical infrastructure 1305, and illustratively comprises one or more hypervisors and/or operating system level virtualization infrastructure. The operating system level virtualization infrastructure illustratively comprises kernel control groups of a Linux operating system or other type of operating system.

The cloud infrastructure 1300 further comprises sets of applications 1310-1, 1310-2, . . . 1310-L running on respective ones of the VMs/container sets 1302-1, 1302-2, . . . 1302-L under the control of the virtualization infrastructure 1304. The VMs/container sets 1302 comprise respective VMs, respective sets of one or more containers, or respective sets of one or more containers running in VMs. In some implementations of the FIG. 13 embodiment, the VMs/container sets 1302 comprise respective VMs implemented using virtualization infrastructure 1304 that comprises at least one hypervisor.

A hypervisor platform may be used to implement a hypervisor within the virtualization infrastructure 1304, wherein the hypervisor platform has an associated virtual infrastructure management system. The underlying physical machines comprise one or more distributed processing platforms that include one or more storage systems.

In other implementations of the FIG. 13 embodiment, the VMs/container sets 1302 comprise respective containers implemented using virtualization infrastructure 1304 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 1300 shown in FIG. 13 may represent at least a portion of one processing platform. Another example of such a processing platform is processing platform 1400 shown in FIG. 14.

The processing platform 1400 in this embodiment comprises a portion of system 100 and includes a plurality of processing devices, denoted 1402-1, 1402-2, 1402-3, . . . 1402-K, which communicate with one another over a network 1404.

The network 1404 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 1402-1 in the processing platform 1400 comprises a processor 1410 coupled to a memory 1412.

The processor 1410 comprises a microprocessor, a microcontroller, an application-specific integrated circuit (ASIC), a field-programmable gate array (FPGA) or other type of processing circuitry, as well as portions or combinations of such circuitry elements.

The memory 1412 comprises random access memory (RAM), read-only memory (ROM) or other types of memory, in any combination. The memory 1412 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1402-1 is network interface circuitry 1414, which is used to interface the processing device with the network 1404 and other system components, and may comprise conventional transceivers.

The other processing devices 1402 of the processing platform 1400 are assumed to be configured in a manner similar to that shown for processing device 1402-1 in the figure.

Again, the particular processing platform 1400 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, storage systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
    generating a hash storage structure by:
        creating multiple layers of storage components, wherein a first of the multiple layers comprises a first number of storage components and wherein at least a second of the multiple layers comprises at least a second number of storage components, wherein the at least a second number of storage components is less than the first number of storage components;
        configuring the at least a second of the multiple layers to share at least a portion of the storage components therein with at least a portion of the storage components in the first layer;
        partitioning each of the storage components in each of the multiple layers into multiple portions; and
        configuring a respective status value space for each of the multiple portions of each of the storage components in the multiple layers;
    implementing the generated hash storage structure in at least one storage system; and
    responsive to at least one specified condition, resizing the generated hash storage structure and implementing the resized generated hash storage structure in the at least one storage system, wherein resizing comprises inserting an additional layer of one or more storage components to the generated hash storage structure, wherein the additional layer of one or more storage components comprises a different number of storage components than at least one of the multiple layers;
    wherein the method is performed by at least one processing device comprising a processor coupled to a memory.

2. The computer-implemented method of claim 1, further comprising:
    expanding the resized generated hash storage structure by inserting a second additional layer of storage components to the resized generated hash structure, wherein the second additional layer comprises a number of storage components that is greater than the first number of storage components contained within the first of the multiple layers.

3. The computer-implemented method of claim 2, wherein the first of the multiple layers comprises N storage components, wherein a second of the multiple layers comprises N/2 storage components, and wherein the second additional layer comprises 2N storage components.

4. The computer-implemented method of claim 2, wherein expanding the generated hash storage structure comprises:
    mapping data from a last of the multiple layers to the second additional layer; and
    rendering the last of the multiple layers eligible for storage.

5. The computer-implemented method of claim 1, wherein the additional layer comprises a number of one or more storage components that is less than a number of storage components contained within a last of the multiple layers.

6. The computer-implemented method of claim 5, wherein resizing the generated hash storage structure comprises:
    mapping data from the first of the multiple layers to the additional layer; and
    rendering the first of the multiple layers eligible for storage.

7. The computer-implemented method of claim 1, wherein configuring the at least a second of the multiple layers comprises configuring a second of the multiple layers to share one of the storage components therein with at least two storage components in the first layer.

8. The computer-implemented method of claim 1, wherein configuring the at least a second of the multiple layers comprises configuring data to be written to in a given one of the storage components of a second of the multiple layers upon a determination that a first of the storage components in the first layer is full, wherein the given one of the storage components of the second layer is also shared with at least a second of the storage components in the first layer.

9. The computer-implemented method of claim 1, wherein each of the multiple portions is configured to store one key-value pair.

10. The computer-implemented method of claim 1, wherein a one byte-length status register is associated with each of the storage components in each of the multiple layers.

11. The computer-implemented method of claim 1, wherein the status value space comprises a space for at least one of a value indicating that the respective portion of the storage component is available for a write operation and a value indicating that the respective portion of the storage component holds a key-value pair.

12. The computer-implemented method of claim 1, wherein the first of the multiple layers comprises N storage components, and wherein a second of the multiple layers comprises N/2 storage components.

13. A non-transitory processor-readable storage medium having stored therein program code of one or more software programs, wherein the program code when executed by at least one processing device causes the at least one processing device:
    to generate a hash storage structure by:
        creating multiple layers of storage components, wherein a first of the multiple layers comprises a first number of storage components and wherein at least a second of the multiple layers comprises at least a second number of storage components, wherein the at least a second number of storage components is less than the first number of storage components;

configuring the at least a second of the multiple layers to share at least a portion of the storage components therein with at least a portion of the storage components in the first layer;

partitioning each of the storage components in each of the multiple layers into multiple portions; and configuring a respective status value space for each of the multiple portions of each of the storage components in the multiple layers;

to implement the generated hash storage structure in at least one storage system; and responsive to at least one specified condition, to resize the generated hash storage structure and implement the resized generated hash storage structure in the at least one storage system, wherein resizing comprises inserting an additional layer of one or more storage components to the generated hash storage structure, wherein the additional layer of one or more storage components comprises a different number of storage components than at least one of the multiple layers.

14. The non-transitory processor-readable storage medium of claim 13, wherein the program code when executed by the at least one processing device causes the at least one processing device:

to expand the resized generated hash storage structure by inserting a second additional layer of storage components to the resized generated hash structure, wherein the second additional layer comprises a number of storage components that is greater than the first number of storage components contained within the first of the multiple layers.

15. The non-transitory processor-readable storage medium of claim 13, wherein the additional layer comprises a number of one or more storage components that is less than a number of storage components contained within a last of the multiple layers.

16. The non-transitory processor-readable storage medium of claim 13, wherein configuring the at least a second of the multiple layers comprises configuring a second of the multiple layers to share one of the storage components therein with at least two storage components in the first layer.

17. An apparatus comprising:
at least one processing device comprising a processor coupled to a memory;
the at least one processing device being configured:
to generate a hash storage structure by:
creating multiple layers of storage components, wherein a first of the multiple layers comprises a first number of storage components and wherein at least a second of the multiple layers comprises at least a second number of storage components, wherein the at least a second number of storage components is less than the first number of storage components;

configuring the at least a second of the multiple layers to share at least a portion of the storage components therein with at least a portion of the storage components in the first layer;

partitioning each of the storage components in each of the multiple layers into multiple portions; and configuring a respective status value space for each of the multiple portions of each of the storage components in the multiple layers;

to implement the generated hash storage structure in at least one storage system; and responsive to at least one specified condition, to resize the generated hash storage structure and implement the resized generated hash storage structure in the at least one storage system, wherein resizing comprises inserting an additional layer of one or more storage components to the generated hash storage structure, wherein the additional layer of one or more storage components comprises a different number of storage components than at least one of the multiple layers.

18. The apparatus of claim 17, wherein the at least one processing device being further configured:

to expand the resized generated hash storage structure by inserting a second additional layer of storage components to the resized generated hash structure, wherein the second additional layer comprises a number of storage components that is greater than the first number of storage components contained within the first of the multiple layers.

19. The apparatus of claim 17, wherein the additional layer comprises a number of one or more storage components that is less than a number of storage components contained within a last of the multiple layers.

20. The apparatus of claim 17, wherein configuring the at least a second of the multiple layers comprises configuring a second of the multiple layers to share one of the storage components therein with at least two storage components in the first layer.

* * * * *

UNITED STATES PATENT AND TRADEMARK OFFICE
CERTIFICATE OF CORRECTION

PATENT NO. : 11,500,815 B2
APPLICATION NO. : 16/830418
DATED : November 15, 2022
INVENTOR(S) : Gopal Singh et al.

Page 1 of 1

It is certified that error appears in the above-identified patent and that said Letters Patent is hereby corrected as shown below:

On the Title Page

In item (57) Abstract, Line 6 replace:
"wherein a first layers comprise"
With:
-- wherein a first layer comprises --

In the Claims

In Claim 8, Column 16, Line 35, replace:
"configuring data to be written to in a given"
With:
-- configuring data to be written to a given --

Signed and Sealed this
Twenty-first Day of May, 2024

Katherine Kelly Vidal
*Director of the United States Patent and Trademark Office*